(12) United States Patent
Hijikata et al.

(10) Patent No.: US 9,402,101 B2
(45) Date of Patent: Jul. 26, 2016

(54) CONTENT PRESENTATION METHOD, CONTENT PRESENTATION DEVICE, AND PROGRAM

(71) Applicant: Panasonic Intellectual Property Corporation of America, Torrance, CA (US)

(72) Inventors: Yoshinori Hijikata, Osaka (JP); Kotaro Sakata, Tokyo (JP); Masaki Yamauchi, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 23 days.

(21) Appl. No.: 14/402,550

(22) PCT Filed: Mar. 12, 2014

(86) PCT No.: PCT/JP2014/001410
§ 371 (c)(1),
(2) Date: Nov. 20, 2014

(87) PCT Pub. No.: WO2014/141704
PCT Pub. Date: Sep. 18, 2014

(65) Prior Publication Data
US 2015/0143394 A1 May 21, 2015

(30) Foreign Application Priority Data
Mar. 15, 2013 (JP) .................. 2013-053938

(51) Int. Cl.
*H04N 21/466* (2011.01)
*H04N 21/8405* (2011.01)
(Continued)

(52) U.S. Cl.
CPC ....... *H04N 21/4661* (2013.01); *G06Q 30/0631* (2013.01); *H04N 21/25891* (2013.01);
(Continued)

(58) Field of Classification Search
CPC .................................... H04N 21/4661
See application file for complete search history.

(56) References Cited

U.S. PATENT DOCUMENTS

| | | | | |
|---|---|---|---|---|
| 5,801,747 A * | 9/1998 | Bedard | ........ | H04H 60/33 348/E17.001 |
| 6,460,036 B1 * | 10/2002 | Herz | ........ | G06F 17/30867 348/E7.056 |

(Continued)

FOREIGN PATENT DOCUMENTS

| | | |
|---|---|---|
| JP | 2004-266396 | 9/2004 |
| JP | 2008-11365 | 1/2008 |

(Continued)

OTHER PUBLICATIONS

International Search Report issued Jun. 17, 2014 in International (PCT) Application No. PCT/JP2014/001410.

*Primary Examiner* — Nicholas Corbo
*Assistant Examiner* — Alexander Q Huerta
(74) *Attorney, Agent, or Firm* — Wenderoth, Lind & Ponack, L.L.P.

(57) ABSTRACT

A content presenting method of the present disclosure includes: a history collecting step of collecting a viewing history of a user; a determining step of analyzing the viewing history to determine an active time segment in which an output section is in a state of being viewed; a data collecting step of collecting meta data assigned to a viewed content; an analyzing step of analyzing the meta data to extract a word representing the content; a profile generating step of generating, for each active time segment, a user profile based on the extracted word; a calculation step of calculating an estimated viewing time; and a playlist generating step of selecting contents based on the user profile generated correspondingly to the active time segment to be compatible with the estimated viewing time, to generate a playlist which defines an order in which the selected contents are played.

7 Claims, 15 Drawing Sheets

(51) Int. Cl.
*G06Q 30/06* (2012.01)
*H04N 21/258* (2011.01)
*H04N 21/262* (2011.01)
*H04N 21/2668* (2011.01)
*H04N 21/44* (2011.01)
*H04N 21/442* (2011.01)
*H04N 21/45* (2011.01)
*H04N 21/4545* (2011.01)
*H04N 21/482* (2011.01)
*H04N 21/845* (2011.01)

(52) U.S. Cl.
CPC ..... *H04N21/2668* (2013.01); *H04N 21/26258* (2013.01); *H04N 21/44008* (2013.01); *H04N 21/44222* (2013.01); *H04N 21/4532* (2013.01); *H04N 21/45457* (2013.01); *H04N 21/4667* (2013.01); *H04N 21/4825* (2013.01); *H04N 21/8405* (2013.01); *H04N 21/8456* (2013.01)

(56) References Cited

U.S. PATENT DOCUMENTS

| | | | | |
|---|---|---|---|---|
| 6,983,478 | B1* | 1/2006 | Grauch | G06Q 30/02 348/E7.07 |
| 9,201,876 | B1* | 12/2015 | Kumar | G06F 17/30 |
| 2002/0129368 | A1* | 9/2002 | Schlack | G06Q 30/02 725/46 |
| 2003/0101451 | A1* | 5/2003 | Bentolila | G06Q 30/0251 725/34 |
| 2006/0106767 | A1* | 5/2006 | Adcock | G06F 17/2785 |
| 2007/0168388 | A1* | 7/2007 | Plastina | G11B 27/034 |
| 2008/0092169 | A1* | 4/2008 | Shannon | H04N 5/44543 725/46 |
| 2009/0204609 | A1* | 8/2009 | Labrou | G06F 17/3064 |
| 2010/0333125 | A1* | 12/2010 | Eldering | H04N 21/2353 725/14 |
| 2012/0222056 | A1* | 8/2012 | Donoghue | H04N 21/25891 725/5 |
| 2012/0331494 | A1* | 12/2012 | Pontual | H04N 21/44222 725/9 |
| 2013/0024183 | A1* | 1/2013 | Cardie | G06F 17/30719 704/8 |
| 2013/0035086 | A1 | 2/2013 | Chardon et al. | |
| 2013/0111526 | A1* | 5/2013 | Glowaty | G06F 17/30817 725/53 |

FOREIGN PATENT DOCUMENTS

| | | |
|---|---|---|
| JP | 4095479 | 6/2008 |
| JP | 2010-283656 | 12/2010 |

\* cited by examiner

FIG.5

ACTIVE TIME SEGMENT d $$D = \begin{bmatrix} w_{11} & \cdots & w_{1n} \\ \vdots & \ddots & \vdots \\ w_{m1} & \cdots & w_{mn} \end{bmatrix} \leftarrow \text{WORDS} \quad (5.1)$$

$$D = U \Sigma V^T \quad (5.2)$$

$$d^{(k)} = U_k^T d \quad (5.3)$$

FIG.6

ACTIVE TIME SEGMENT $t_d$ $$D = \begin{bmatrix} w_{11} & \cdots & w_{1n} \\ \vdots & \ddots & \vdots \\ w_{m1} & \cdots & w_{mn} \end{bmatrix} \leftarrow \text{WORDS} \quad (6.1)$$

$$t_{dj} = A t_{sj} \quad (6.2)$$

$$D = AS \quad (6.3)$$

$$Y = WD \quad (6.4)$$

$$\hat{D} = Y^T D \quad (6.5)$$

$$\hat{t}_d = Y^T t_d \quad (6.6)$$

TOPIC $t_s$ $$S = \begin{bmatrix} s_{11} & \cdots & s_{1n} \\ \vdots & \ddots & \vdots \\ s_{m1} & \cdots & s_{mn} \end{bmatrix} \leftarrow \text{WORDS} \quad (6.7)$$

FIG.7

\<prog\>
"OHAYO GENKI DESU"

* BROADCAST CONTENT FOR 6:45 TO 8:00 SEP 1, 2015 (THU)

* G CODE:

* SHARED
* TO BE SHARED
* REGISTER IN CALENDAR
* REGIONAL SETTING

* \<PREVIOUS BROADCAST
* SEP 1, 2015 (THU)
* NEXT BROADCAST\>

* LAST UPDATED: 00:04 AUG 25, 2011 (THU)

MORNING IN KANSAI STARTS WITH "OHAYO GENKI DESU".
   WE ENTERTAIN YOU WITH LATEST INFORMATION INCLUDING
   LATEST GOURMET AND NEW PRODUCT INFORMATION
   AS WELL AS NEWS AND SPORTS.

FIG.8

$$\mathbf{v}_1 = [v_{11}, v_{12}, \cdots, v_{1m}]$$

$$\mathbf{v}_2 = [v_{21}, v_{22}, \cdots, v_{2m}] \quad (8.1)$$

$$\mathbf{v}_n = [v_{n1}, v_{n2}, \cdots, v_{nm}]$$

$$\mathbf{p} = [p_1, p_2, \cdots, p_m] \quad (8.2)$$

$$p_1 = \frac{v_{11} + v_{21} + \cdots + v_{n1}}{n}$$

$$p_2 = \frac{v_{12} + v_{22} + \cdots + v_{n2}}{n} \quad (8.3)$$

$$p_m = \frac{v_{1m} + v_{2m} + \cdots + v_{nm}}{n}$$

FIG.9

$$p = [d_1, d_2, \cdots, d_m]^t \qquad (9.1)$$

$$D = [p_1, p_2, \cdots, p_n] = \begin{bmatrix} w_{11} & w_{12} & \cdots & w_{1n} \\ w_{21} & w_{22} & \cdots & w_{2n} \\ \vdots & \vdots & \ddots & \vdots \\ w_{m1} & w_{m2} & \cdots & w_{mn} \end{bmatrix} \qquad (9.2)$$

FIG.10

DOCUMENTS

$D_1$: ALPHA TO FORM NEW CORPORATION WITH BETA $D_2$: ALPHA TO FORM JOINT CORPORATION WITH BETA GROUP $D_3$: BETA TO BE "ALPHA MOBILE"

$D_4$: ALPHA MERGES WITH BETA, AND CAPITALIZED AT UP TO 11 BILLION YEN $D_5$: ALPHA TO CHANGE COMPANY NAME FROM BETA TO "ALPHA MOBILE"

INDEX WORDS

$w_1$: ALPHA
$w_2$: BETA
$w_3$: CORPORATION
$w_4$: JOINT
$w_5$: MOBILE
$w_6$: CAPITAL
$w_7$: UP TO
$w_8$: 11 BILLION YEN
$w_9$: COMPANY NAME
$w_{10}$: CHANGE

$$= [1, 0, 0, 0, 1, 0, 0, 0, 0, 0]^t \quad (11.1)$$

↑ ALPHA  ↑ MOBILE

SIMILAR $$D = \begin{bmatrix} D_1 \\ D_2 \\ D_3 \\ D_4 \\ D_5 \end{bmatrix}^t = \begin{bmatrix} 1 & 1 & 1 & 0 & 0 & 0 & 0 & 0 & 0 & 0 \\ 1 & 1 & 1 & 1 & 0 & 0 & 0 & 0 & 0 & 0 \\ 1 & 1 & 0 & 0 & 1 & 0 & 0 & 0 & 0 & 0 \\ 1 & 1 & 0 & 1 & 0 & 1 & 1 & 1 & 0 & 0 \\ 2 & 1 & 0 & 0 & 1 & 0 & 0 & 0 & 1 & 1 \end{bmatrix}^t \quad (11.2)$$

FIG.12

$$tf - idf = tf \cdot idf \qquad (12.1)$$

$$idf_{ij} = \log \frac{n}{n_i} \qquad (12.2)$$

CONTENT PRESENTATION METHOD, CONTENT PRESENTATION DEVICE, AND PROGRAM

TECHNICAL FIELD

The present invention relates to a content presentation method, apparatus and program for presenting a content depending on a user's preference and circumstance.

BACKGROUND ART

In recent years, many e-commerce websites and content distribution websites (websites distributing contents, such as news articles, videos and games) provide recommendation function. The recommendation function is a function of extracting information regarding a user's interest and preference from the user's purchase history, browsing history, viewing history, or the like, so as to recommend items and contents that the user is likely to be interested in. In order to realize such a user-adaptive service, many websites identify individuals through user log-in authentication or by using the cookie function of web browsers.

While the recommendation function has become common with many web-based services, the recommendation function is not yet common with program browsing and video browsing (including video browsing on a television via the Internet, e.g., video browsing on demand) on a television receiver (hereinafter, "television"). Reasons for this include: one television being shared by more than one person to watch in many houses; it being difficult to perform a log-in operation, common to a web-based service, using a television remote controller with limited buttons.

With a television viewed by more than one person, it is not possible to know, only by analyzing its viewing history, how many people there are in the family, what the constituents of the family are like, and who watches what kind of programs and videos. This means that a user profile regarding individual interest and preference cannot be generated, which is a big problem for systems that provide recommendation functions.

It is possible to identify individuals with a personal authentication device attached on a television. For example, it may be fingerprint authentication, facial recognition, voice recognition, etc. However, this increases the manufacturing cost of remote controllers or televisions themselves. It may be possible to provide buttons for personal identification on a remote controller, but with televisions which are viewed passively in a living room, it will be a burden on a user to operate such buttons before viewing.

Under such circumstances, a content selecting viewing apparatus is known, which presents candidates of living hours adaptive content, which are adapted to viewers' living hours, based on the viewing history of the viewers viewing contents, so that a user selects and views the candidates of living hours adaptive content (see Patent Document 1). The invention disclosed in Patent Document 1 includes a receiving section, a content meta data group storing section, a viewing history recording section, a user preference data generating section, a user preference data recording section, an input section, a search filtering section, an input-switching output section, and an MPEG decoder section.

A program information providing apparatus is also known, which predicts, for each day of the week, viewable time slots in which a user can view television programs (see Patent Document 2). With the invention disclosed in Patent Document 2, the program information providing apparatus first analyzes user preferences. Then, the program information providing apparatus predicts viewable time slots in which a user can view television programs for each day of the week. Then, for each day of the week, the program information providing apparatus selects television programs that the user can view in the viewable time slots and that suit the user's preferences, based on information on the analyzed preferences, information on the predicted viewable time slots, and program information on television programs to be broadcast. Then, a user terminal device transmits information regarding television programs that suit the user's preferences to the user terminal device. Then, the user terminal device displays, on a television receiver, program guide information transmitted thereto. Thus, it is possible to provide the user with information of television programs that are viewable.

However, further improvements are needed for Patent Documents 1 and 2 described above.

CITATION LIST

Patent Document

Patent Document 1: Japanese Patent No. 4095479
Patent Document 2: Japanese Unexamined Patent Publication No. 2010-283656

SUMMARY OF INVENTION

In order to solve the above conventional problem, an aspect of the present invention is a content presentation method in a content presentation device which presents a content to a user, the method including: a history collecting step of collecting a viewing history of the user viewing a content output on an output section; a determining step of analyzing the collected viewing history to determine an active time segment in which the output section is in a state of being viewed; a data collecting step of collecting meta data assigned to the content viewed by the user; an analyzing step of analyzing the collected meta data to extract a word representing the viewed content; a profile generating step of generating, for each of the determined active time segments, a user profile based on the extracted word corresponding to the content viewed in the active time segment of interest; a calculation step of obtaining current time and identifying an active time segment including the obtained current time, to calculate an estimated viewing time, which is a time length from the obtained current time to a point in time at which the identified active time segment ends; and a playlist generating step of selecting contents based on the user profile generated correspondingly to the identified active time segment to be compatible with the calculated estimated viewing time, to generate a playlist which defines an order in which the selected contents are played.

According to one aspect of the present invention, since the user profile is generated for each active time segment, it is possible to select contents that suit the individual users' preference, and it is possible to generate playlists that suit the life patterns of the individual users.

BRIEF DESCRIPTION OF DRAWINGS

FIG. 5 is a diagram showing a singular value decomposition according to the present embodiment.

FIG. 6 is a diagram showing an independent component analysis according to the present embodiment.

FIG. 7 is a diagram showing an example of video content information according to the present embodiment.

FIG. 8 is a diagram schematically showing a specific example of profile vector calculation according to the present embodiment.

FIG. 9 is a diagram illustrating a vector representation of a vector space model according to the present embodiment.

FIG. 10 is a diagram showing an example of documents and index words according to the present embodiment.

FIG. 11 is a diagram showing an example of a search query and a document according to the present embodiment.

FIG. 12 is a diagram illustrating the tf-idf value according to the present embodiment.

Figure 1:
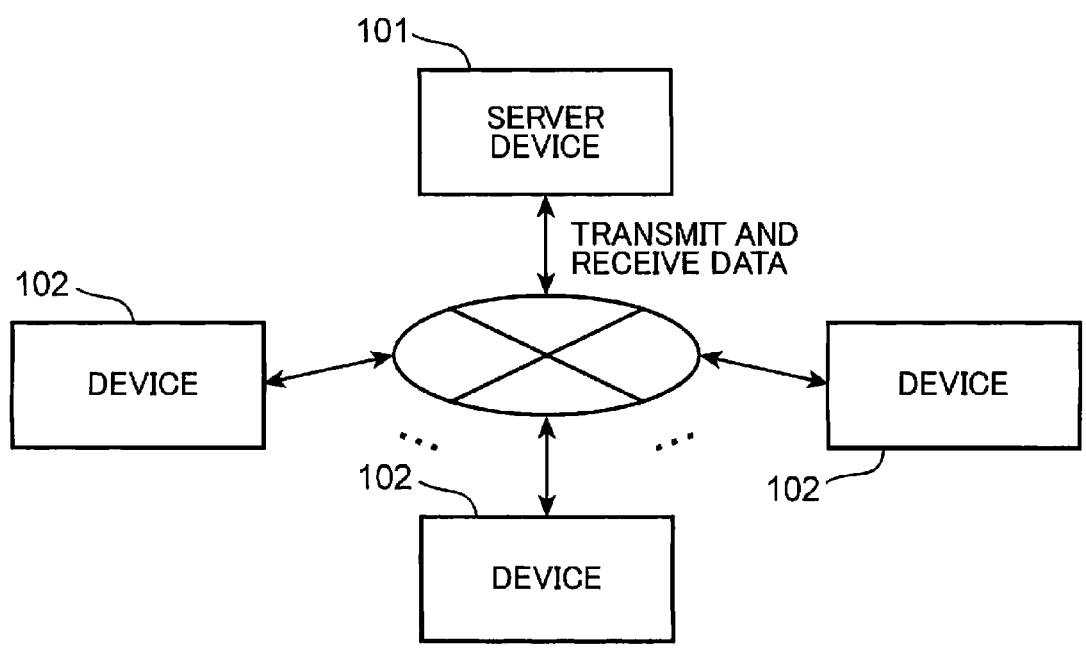
FIG. 1 is a diagram showing a configuration of an entire system according to the present embodiment.

DESCRIPTION OF EMBODIMENTS (Story Before Inventing Aspect According to Present Disclosure)

First, the point of view of an aspect according to the present disclosure will be described.

Apparatuses described in Patent Documents 1 and 2 are for presenting contents for the current day of the week to the viewer based on the viewing history for each day of the week. Therefore, it is difficult to accommodate viewing videos via the Internet (e.g., viewing videos on demand). Therefore, with the configurations described in Patent Documents 1 and 2, where a user views video contents via the Internet, or the like, the user needs to select a video content to be viewed next each time the playback of one video content ends.

It is stated that the apparatus described in Patent Document 1 presents contents in accordance with the life styles of the individual viewers. However, it fails to mention at all a technique for identifying individual viewers in a case where a single television is shared by a plurality of viewers. Patent Document 2 merely provides a description assuming a case where there is one viewer. Thus, the apparatuses described in Patent Documents 1 and 2 are difficult to use in a case where a single television is shared by a plurality of viewers.

Even when a single television is shared by a plurality of viewers, there is a set pattern to some extent to how the television is viewed, for many families. In one family, for example, the father views a news program on weekday mornings. Then, the mother views a morning information program. When a four-year boy wakes up, a kids program is viewed. When some of the family members have gone to work or school, the grandparents view information programs. In the evening, the kids view a kids animation. Then, the grandparents view their favorite travel or gourmet programs. The father, having returned home at about 10 pm, views news programs or business information programs. Different programs are viewed on different days. Nevertheless, there is a set life pattern to some extent for each individual. Therefore, it is believed that there is a set viewing pattern to some extent, as to the primary viewer for each time period of the day, and the genre of content to be viewed by that viewer.

Thus, in view of such considerations, the present inventors have arrived at conceiving inventions of various aspects of the present disclosure as set forth below.

An aspect of the present disclosure is a content presentation method in a content presentation device which presents a content to a user, the method including: a history collecting step of collecting a viewing history of the user viewing a content output on an output section; a determining step of analyzing the collected viewing history to determine an active time segment in which the output section is in a state of being viewed; a data collecting step of collecting meta data assigned to the content viewed by the user; an analyzing step of analyzing the collected meta data to extract a word representing the viewed content; a profile generating step of generating, for each of the determined active time segments, a user profile based on the extracted word corresponding to the content viewed in the active time segment of interest; a calculation step of obtaining current time and identifying an active time segment including the obtained current time, to calculate an estimated viewing time, which is a time length from the obtained current time to a point in time at which the identified active time segment ends; and a playlist generating step of selecting contents based on the user profile generated correspondingly to the identified active time segment to be compatible with the calculated estimated viewing time, to generate a playlist which defines an order in which the selected contents are played.

According to this aspect, since a user profile is generated for each active time segment, it is possible to select contents that suit the individual users' preferences, and it is possible to generate playlists that suit the life patterns of the individual users.

In the aspect described above, for example, the method may further include an outputting step of outputting, on the output section, the selected contents in the order defined in the generated playlist.

According to this aspect, the user can view video contents including Internet videos that can be viewed on demand via the Internet in a passive manner as with television broadcast programs.

In the aspect described above, for example, the profile generating step may include: a step of generating a matrix, for each column corresponding to the determined active time segment, of which an element of a row is a tf-idf value of the extracted word; and a step of generating, as the user profile for each active time segment, a latent profile vector from the generated matrix using a singular value decomposition or an independent component analysis. The playlist generating step may include: a step of identifying selection candidate contents that can be viewed at the obtained current time; a step of extracting a word representing the identified selection candidate contents from meta data assigned to the identified selection candidate contents; a step of generating a vector, of which an element is a tf-idf value of the extracted word; a step of generating a latent video content vector from the generated vector using a singular value decomposition or an independent component analysis; and a step of comparing each of the latent video content vectors of the selection candidate contents and the latent profile vector to select contents to be listed on the playlist from the selection candidate contents based on similarity between the compared vectors.

According to this aspect, the latent video content vectors of the selection candidate contents and the latent profile vector are respectively compared, and contents to be listed on the playlist are selected from the selection candidate contents based on the similarity between the compared vectors. Therefore, even if there are few common words between words representing the content viewed in the active time segment and words representing the identified selection candidate content, contents belonging to the same genre can be selected precisely.

In the aspect described above, for example, the history collecting step may not collect a content viewed by the user as the viewing history when a broadcasting time of the content viewed by the user exceeds a time segment in which the output section is in a state of being viewed and is not more than a predetermined threshold value.

According to this aspect, those contents which the user started to view but stopped viewing in a short amount of time which is not more than a predetermined threshold value are not included in the viewing history. Thus, it is possible to reduce noise related to the viewing history. Note however that if the broadcasting time of the content viewed by the user is not more than the time segment in which the output section is in a state of being viewed, the user may have viewed the content to the end. Therefore, in such a case, the content is collected as the viewing history.

In the aspect described above, for example, the output section may be a television receiver. If the user switches a channel to another and the user then switches the channel from the other channel back to the original channel within a predetermined threshold amount of time, the history collecting step may not collect the switching of the channel by the user as the viewing history except when broadcast of the content finishes while the other channel remains on.

According to this aspect, such switching between channels that is a result of the user zapping is not included in the viewing history. Thus, it is possible to reduce noise related to channel switching. Note however that when the broadcast of a content finishes while the new channel remains on, the content may have been viewed to the end. Therefore, in such a case, such channel switching is collected as the viewing history.

In the aspect described above, for example, the playlist generating step may include a step of counting the number of times the selected content has been included in the playlist and has not been viewed by the user. The playlist generating step may not include, in the playlist, a content for which the counted number of times reaches a predetermined number of times even when the content is selected based on the user profile.

According to this aspect, specific contents that are included in the genre preferred by the user but are not viewed by the user can be prevented from being included in the playlist. Thus, it is possible to recommend contents that suit the user's preference in an even more precise manner.

Another aspect of the present disclosure is a content presentation device including: an output section which outputs a content; a history collecting section which collects a viewing history of a user viewing a content output on the output section; a determining section which analyzes the collected viewing history to determine an active time segment in which the output section is in a state of being viewed; a data collecting section which collects meta data assigned to the content viewed by the user; an analyzing section which analyzes the collected meta data to extract a word representing the viewed content; a profile generating section which generates, for each of the determined active time segments, a user profile based on the extracted word corresponding to the content viewed in the active time segment of interest; a calculating section which obtains current time and identifies an active time segment including the obtained current time, to calculate an estimated viewing time which is a time length from the obtained current time to a point in time at which the identified active time segment ends; and a playlist generating section which selects contents based on the user profile generated correspondingly to the identified active time segment to be compatible with the calculated estimated viewing time, to generate a playlist which defines an order in which the selected contents are played.

Still another aspect of the present disclosure is a program for controlling a content presentation device which presents a content to a user, the program causing a computer of the content presentation device to execute: a history collecting step of collecting a viewing history of the user viewing a content output on an output section; a determining step of analyzing the collected viewing history to determine an active time segment in which the output section is in a state of being viewed; a data collecting step of collecting meta data assigned to the content viewed by the user; an analyzing step of analyzing the collected meta data to extract a word representing the viewed content; a profile generating step of generating, for each of the determined active time segments, a user profile based on the extracted word corresponding to the content viewed in the active time segment of interest; a calculation step of obtaining current time and identifying an active time segment including the obtained current time, to calculate an estimated viewing time which is a time length from the obtained current time to a point in time at which the identified active time segment ends; and a playlist generating step of selecting contents based on the user profile generated correspondingly to the identified active time segment to be compatible with the calculated estimated viewing time, to generate a playlist which defines an order in which the selected contents are played.

Note that these general or specific aspects may be implemented as methods, integrated circuits, computer programs or computer-readable recording media such as CD-ROMs, or may be implemented as arbitrary combinations of methods, integrated circuits, computer programs and recording media.

EMBODIMENTS

Embodiments of the present disclosure will now be described with reference to the drawings.

FIG. 1 is a diagram showing a configuration of an entire system according to the present embodiment.

As shown in FIG. 1, a device 102 having a function of connecting to a network is connected to an external server device 101 via a network. Transmitting and receiving of data, such as transmitting and receiving of programs, transmitting and receiving of user-related data, and transmitting and receiving of control data for controlling the device 102 is performed between the device 102 and the server device 101 via the network.

Figure 2:
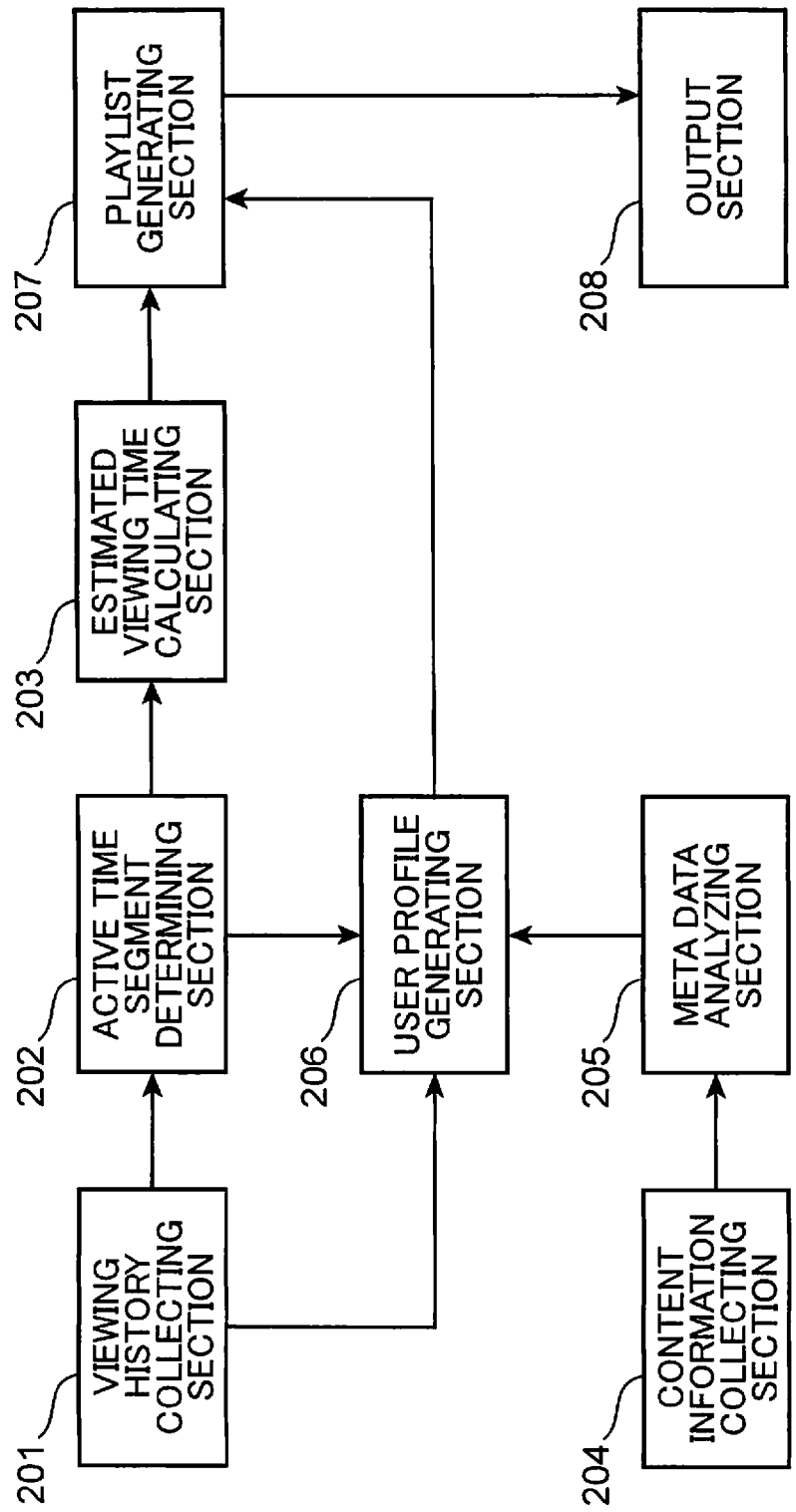
FIG. 2 is a block diagram showing a configuration of a content presentation device according to the present embodiment.

FIG. 2 is a block diagram showing a configuration of a content presentation device according to the present embodiment.

As shown in FIG. 2, the content presentation device of the present embodiment includes a viewing history collecting section 201, an active time segment determining section 202, an estimated viewing time calculating section 203, a content information collecting section 204, a meta data analyzing section 205, an user profile generating section 206, a playlist generating section 207, and an output section 208.

The output section 208 outputs various information. For example, the output section 208 receives a television broadcast program (a content), and displays the received television broadcast program. For example, the output section 208 displays a video content obtained on demand via the Internet. The output section 208 is a television receiver in the present embodiment. Alternatively, the output section 208 may be a display device of a personal computer. Alternatively, the output section 208 may be a portable terminal such as a tablet or a so-called "smartphone".

The viewing history collecting section 201 (an example of the history collecting section) collects the viewing history of a user who views contents displayed on the output section 208 as the power of the output section 208 is turned on. The viewing history collecting section 201 includes a storage device such as a hard disk or a semiconductor memory, for example. The viewing history collecting section 201 stores the time period (the viewing start time and the viewing finish time) for which the user has viewed contents displayed on the output section 208. The viewing history collecting section 201 stores titles, or the like, of contents such as television broadcast programs or Internet videos viewed by the user. The viewing history collecting section 201 further stores points in time at which the user has switched the channel of the output section 208.

The content information collecting section 204 (an example of the data collecting section) collects meta data assigned to a content. Where the content is a television broadcast program, for example, meta data is text data (see FIG. 7 to be described below) provided by an electronic program guide (EPG). Where the content is an Internet video obtained on demand via the Internet, for example, the meta data is text data added to the Internet video and describing the Internet video. The content information collecting section 204 collects and stores meta data assigned to all contents displayed on the output section 208 and viewed by users. The content information collecting section 204 includes a storage device such as a hard disk or a semiconductor memory, for example. The viewing history collecting section 201 and the content information collecting section 204 may share a storage device.

The meta data analyzing section 205 (an example of the analyzing section) analyzes the collected meta data. The meta data analyzing section 205 performs a morphological analysis on the collected meta data to extract words. Based on the analysis results of the morphological analysis, the meta data analyzing section 205 extracts words (index words) including particular parts of speech (nouns and verbs). The meta data analyzing section 205 obtains the number of occurrences of each extracted word (index word).

The active time segment determining section 202 (an example of the determining section) analyzes the viewing history collected by the viewing history collecting section 201 to determine, as an active time segment, a time period in which the output section 208 is in a state of being viewed.

(Pseudo Personal Identification)

Figure 3:
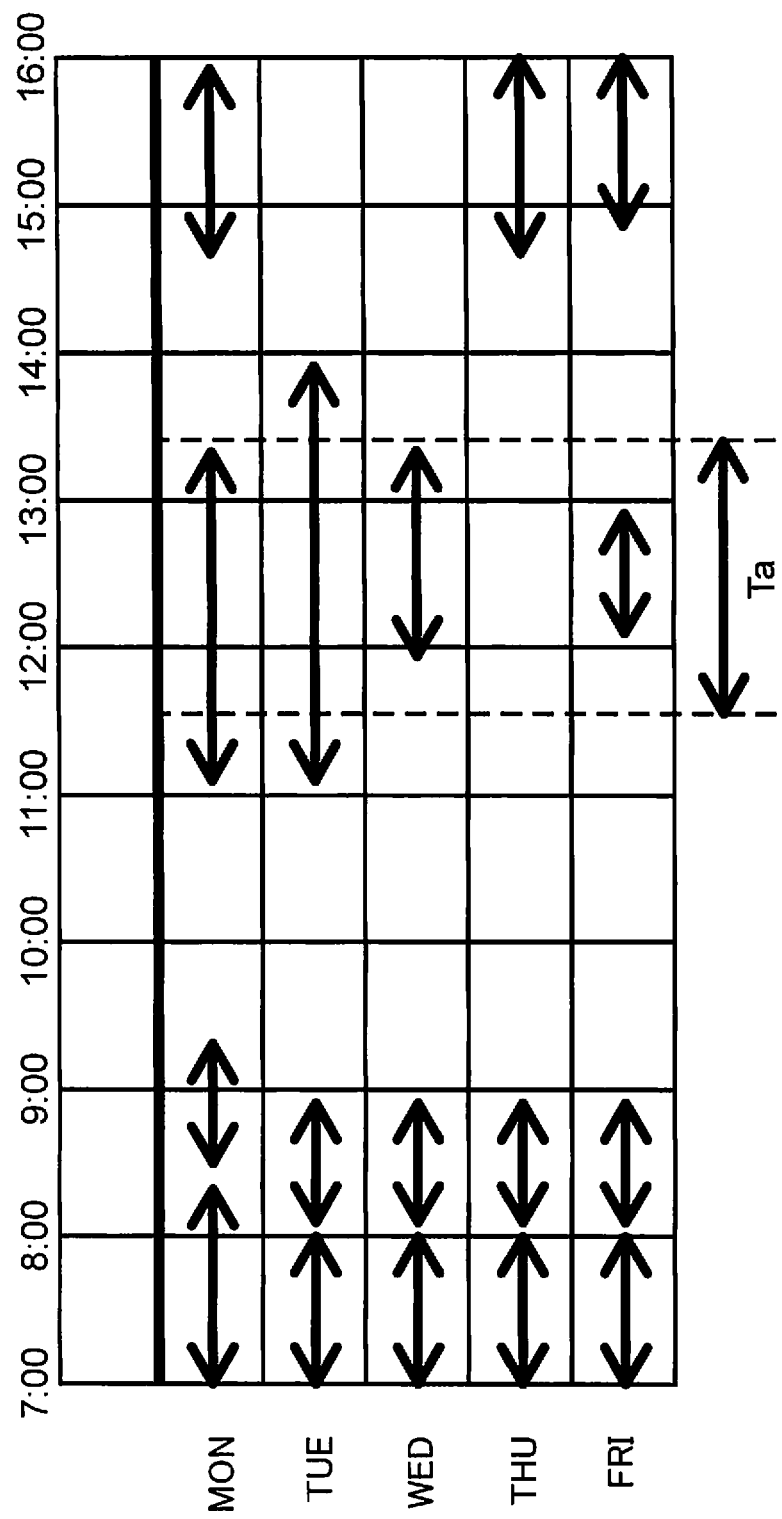
FIG. 3 is a diagram showing an example of an active time segment according to the present embodiment.

FIG. 3 is a diagram showing an example of an active time segment according to the present embodiment.

The active time segment determining section 202 estimates a time segment in which the power of the output section 208 is probably ON. Specifically, as shown in FIG. 3, for example, the viewing history collecting section 201 records the point in time at which the power of the output section 208 is turned ON and the point in time at which it is turned OFF (and points in time at which the channel is switched to another).

From this record, the active time segment determining section 202 identifies points in time, during a certain day of the week (the day of the week is not specified in the present embodiment), at which the power of the output section 208 is probably ON. The active time segment determining section 202 scans through 24 hours of the day, with, for example 10-minute intervals, thereby identifying the points in time. In FIG. 3, one of the points in time at which the power of the output section 208 is probably ON is around 12:30. Thus, the active time segment determining section 202 identifies 12:30 as a point in time at which the power of the output section 208 is probably ON.

Next, the active time segment determining section 202 extracts all ON-to-OFF time segment logs in which the power of the output section 208 is ON at the identified point in time. For example, in FIG. 3, four time segment logs are extracted, that is, 11:10 to 12:40 of Monday, 11:00 to 14:00 of Tuesday, 11:30 to 13:30 of Wednesday, and 11:30 to 12:30 of Friday.

Next, from the time segment logs, the active time segment determining section 202 obtains the average start time (11:30 in the example of FIG. 3) and the average finish time (13:30 in the example of FIG. 3). Thus, the active time segment determining section 202 determines, as an active time segment Ta, 11:30 to 13:30 which is a time segment in which the power of the output section 208 is probably ON.

Note that while scanning through 24 hours of the day with, for example, 10-minute intervals, the active time segment determining section 202 first identifies a point in time at which the power of the output section 208 is most probably ON, and determines, as the first active time segment, a time segment centered about the identified point in time. Then, from the time slots excluding the determined active time segment, the active time segment determining section 202 identifies a point in time at which the power of the output section 208 is next most probably ON, and determines, as the second active time segment, a time segment centered about the identified point in time. Thus, the active time segment determining section 202 determines active time segments through 24 hours of the day.

The active time segment determining section 202 may determine, as a point in time at which the power is ON, a point in time at which the power of the output section 208 is ON for 50% or more of the days of one month, for example, from the user's viewing history collected by the viewing history collecting section 201.

In the present embodiment, the active time segment determining section 202 determines the active time segment, irrespective of the day of the week. However, the present disclosure is not limited to this. The active time segment determining section 202 may determine active time segments separately for Saturdays, Sundays and holidays, and for weekdays.

As described above, in the present embodiment, the active time segment determining section 202 determines, as the active time segment, a time segment in which the power of the output section 208 is probably ON. Now, where the output section 208 is shared by a plurality of users, it is believed that there is a substantially set life pattern for each individual user, as described above. Therefore, the user who views the output section 208 in a specified active time segment is believed to be always the same user. Thus, determining an active time segment can be said to be pseudo identification of a user.

Referring back to FIG. 2, the estimated viewing time calculating section 203 (an example of the calculating section) obtains the current time when the power of the output section 208 is switched from OFF to ON. The estimated viewing time calculating section 203 identifies the active time segment that includes the obtained current time from among the active time segments, which have been determined by the active time segment determining section 202. Based on the identified active time segment and the current time, the estimated viewing time calculating section 203 calculates the estimated viewing time, which is the length from the current time to a point in time at which the user is expected to stop viewing (the end time of the identified active time segment).

The user profile generating section 206 (an example of the profile generating section) generates a user profile for each active time segment determined by the active time segment determining section 202. The user profile generating section 206 calculates the tf-idf value from the number of occurrences of words (index words) extracted by the meta data analyzing section 205. The tf-idf value will be described later.

For each content viewed by a user, the user profile generating section 206 generates a vector of which an element is the tf-idf value (hereinafter referred to as the "video content vector"). Moreover, the user profile generating section 206 generates a vector of which an element is the average value (arithmetic mean) among elements of all video content vectors viewed by the user in an active time segment of interest. This vector is referred to as the profile vector for the active time segment of interest. The user profile generating section 206 generates a profile vector as a user profile of an active time segment.

FIG. 8 is a diagram schematically showing a specific example of profile vector calculation according to the present embodiment. Expression (8.1) represents the video content vectors $v_1$ to $v_n$ of n video contents viewed in the active time segment of interest. Now, it is assumed that a profile vector p is expressed as shown in Expression (8.2). In this case, the user profile generating section 206 works out each element of the profile vector p as the average value among respective elements of the video content vectors $v_1$ to $v_n$, as shown in Expression (8.3).

(Recommending Video Contents)

The playlist generating section 207 selects a content to be recommended, based on the user profile generated by the user profile generating section 206, so as to be compatible with the estimated viewing time calculated by the estimated viewing time calculating section 203. The playlist generating section 207 generates a playlist, which defines the order in which the selected contents are played. The playlist generating section 207 outputs the generated playlist to the output section 208 to present it to the user.

The playlist generating section 207 selects contents based on the vector space model, which is well known in the field of information search. The playlist generating section 207 selects contents when the power of the output section 208 is turned ON. In this case, the playlist generating section 207 first obtains the current time when the power of the output section 208 is turned ON. Next, the playlist generating section 207 identifies an active time segment including the current time therein. Next, the playlist generating section 207 obtains, from the user profile generating section 206, a profile vector of the identified active time segment.

Next, the playlist generating section 207 obtains television broadcast programs (video contents) being broadcast at the current time, and video content information (meta data) of video contents that can be obtained on demand via the Internet at the current time. The playlist generating section 207 generates video content vectors by a method as described above. The playlist generating section 207 may generate video content vectors by a method as described above by controlling the content information collecting section 204, the meta data analyzing section 205 and the user profile generating section 206.

The playlist generating section 207 calculates each similarity between each of the video content vectors of the video contents and the profile vector. The playlist generating section 207 calculates using the cosine distance (referred to also as "cosine similarity") as a method for calculating the similarity. The playlist generating section 207 selects video contents of which the calculated similarity is greater than a predetermined threshold value.

Moreover, the playlist generating section 207 may control the output section 208 according to the generated playlist so as to automatically output contents on the output section 208 in the play order defined in the playlist. On the other hand, the playlist generating section 207 may only present the playlist on the output section 208 without automatically outputting the contents on the output section 26. In this case, the user may view contents on the playlist by operating the output section 208.

Figure 4:
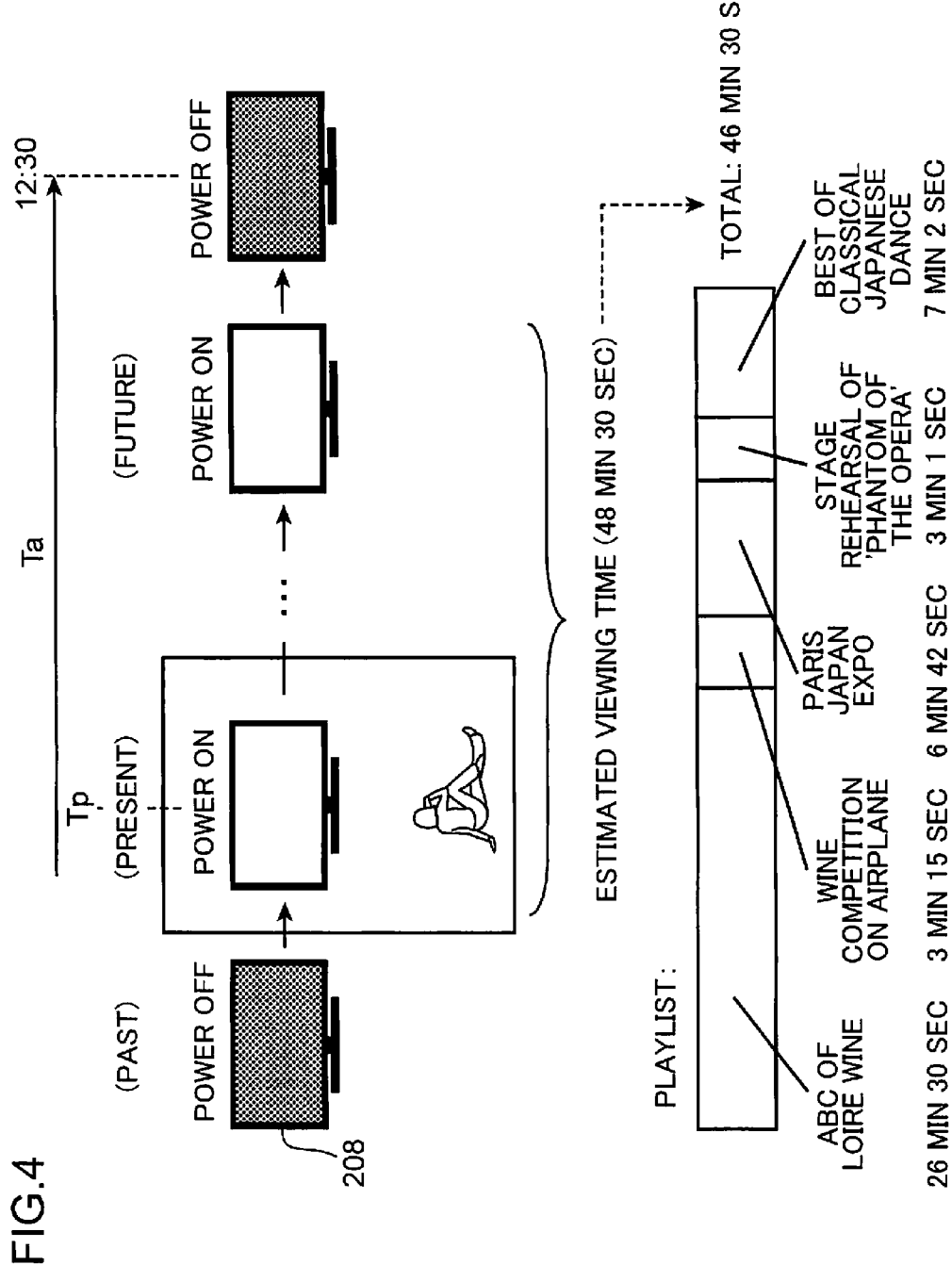
FIG. 4 is a diagram showing an example of a playlist according to the present embodiment.

FIG. 4 is a diagram showing an example of a playlist according to the present embodiment.

The playlist generating section 207 generates a playlist of the selected video contents based on the estimated viewing time calculated by the estimated viewing time calculating section 203. For example, it is assumed that the current time Tp at which the power of the output section 208 is turned ON is included in the active time segment Ta, as shown in FIG. 4. It is assumed that the estimated viewing time from the current time Tp to the end time 12:30 of the active time segment Ta is calculated to be 48 min 30 sec by the estimated viewing time calculating section 203. In this case, the playlist generating section 207 generates a playlist so as to be compatible with a predetermined time width, centered about the end time of the estimated viewing time.

In the present embodiment, the time width is set to 4 min, for example. In this case, the playlist generating section 207 generates a playlist so that the viewing time of the selected contents is between 46 min 30 sec and 50 min 30 sec. In the playlist shown in FIG. 4, the total viewing time of all contents is 46 min 30 sec.

Alternatively, the time width may be set to 2% of the estimated viewing time, for example. In this case, the time width is 48 min 30 sec×0.02=58 sec. Thus, the playlist generating section 207 generates a playlist so that the viewing time of the selected contents is between 48 min 1 sec and 48 min 59 sec.

The playlist generating section 207 basically lists contents on the playlist in the order of similarity. In the example of FIG. 4, "ABC of Loire Wine" has the highest similarity. Then, "Wine Competition On Airplane" has the next highest similarity. Then, "Paris Japan Expo" has the next highest similarity. Then, "Stage Rehearsal Of 'Phantom Of The Opera'" has the next highest similarity.

The last content of the playlist of FIG. 4, "Best Of Classical Japanese Dance", is selected while taking into consideration the estimated viewing time, the time width and the viewing time of the content. For example, the content having the next highest similarity to that of "Stage Rehearsal Of 'Phantom Of The Opera'" may have a long viewing time so that the total viewing time will be over 50 min 30 sec. In such a case, the playlist generating section 207 selects a content to be listed on the playlist while taking into consideration the viewing time of the content. In FIG. 4, for example, the playlist generating section 207 selects "Best Of Classical Japanese Dance", of which the viewing time is 7 min 2 sec, and lists it on the playlist.

Note that the content presentation device shown in FIG. 2 may be the device 102 of FIG. 1 or may be the server device 101 of FIG. 1.

The content presentation device shown in FIG. 2 is implemented by a microprocessor, a ROM, a RAM, a hard disk, etc., not specifically shown in the figures. Computer programs are stored in the ROM, the RAM and the hard disk, and the server device performs its functions as the microprocessor operates according to the programs.

Note that the functional blocks of the viewing history collecting section 201, the active time segment determining section 202, the estimated viewing time calculating section 203, the content information collecting section 204, the meta data analyzing section 205, the user profile generating section 206 and the playlist generating section 207 may be implemented by software, or by a combination of a large scale integrated circuit (LSI) and software, or by an LSI.

(Estimating Latent Topics)

When recommending a content, video content information represented in text is the information on which the recommendation is based. The program information of a television broadcast program is provided in the EPG. Program information in the EPG includes many proper nouns, such as names of actors to appear, place names of destinations for travel programs, and song names for music programs. Therefore, for a plurality of programs belonging to the same genre, there may be few common words appearing in the program information of these programs. For example, for the genre of travel programs, words appearing in the program information of "Bon Voyage" may be "Odawara, Mizugawara, Godai Haruko", whereas words appearing in the program information of "Walking Trip" may be "Minamino Tenmangu, Wonder Café, Mitamura Kuniya".

In such a case, the similarity between two programs may be low even though they are of the same genre of travel programs. Therefore, it is necessary to acquire a topic (latent topic) from these individual groups of words, the topic being latently represented by the groups of words. Moreover, program information of the EPG has a short description. Therefore, it is insufficient to calculate the similarity between programs based only on co-occurrence of words. This tendency not only applies to program information of the EPG, but similarly applies also to description text of video contents in general.

In view of this, in the present embodiment, only after obtaining a plurality of (e.g., 50 or 100) video contents viewed by users in the active time segment, the user profile generating section 206 may estimate latent topics of video contents from the content information (meta data) of those video contents. Specifically, with respect to the example described above, the user profile generating section 206 may statistically extract, from program information, a latent topic of "travel", which is not apparently included in the words appearing in the program information. Note that the precision of estimating latent topics improves as the number of contents viewed increases.

If such latent topics are obtained in advance, it is possible to express a video content in terms of latent topics. That is, a user profile for each active time segment can also be expressed in terms of latent topics. Some methods can be employed for the estimation of such latent topics. In the present embodiment, the user profile generating section 206 estimates a latent topic using one of the three methods: (A) clustering, (B) singular value decomposition, and (C) independent component analysis to be described below.

(A) Clustering

When a large number of video contents are obtained, they can be grouped into a plurality of clusters, each containing similar video contents. A technique for automatically doing this is called "clustering". In the present embodiment, clustering is done using a well-known clustering algorithm. Three applicable clustering algorithms are the k-means clustering, the agglomerative method (Tree-clustering), and the hierarchical clustering based on the Newman's modularity.

Once clusters are extracted, a video content vector and a profile vector are expressed as a latent video content vector and a latent profile vector, using the clusters as elements thereof. With the k-means clustering and the agglomerative method, the number of clusters needs to be given in advance. This is determined by trial and error. The user profile generating section 206 may determine the optimal number of clusters by other calculations, for example.

On the other hand, with the hierarchical clustering based on the Newman's modularity, an appropriate number of clusters is determined automatically. Note however that this clustering algorithm is used when clustering nodes in a network. Therefore, when using this on video contents, it is necessary to provide links in advance between video contents. For example, one may possibly provide links between video content vectors based on similarity.

(B) Singular Value Decomposition

FIG. 5 is a diagram showing a singular value decomposition according to the present embodiment.

There are methods by which having elements in a vector that are relevant to each other is taken as a latent feature. A representative one of such methods uses a singular value decomposition. In the field of information search, this is referred to as latent semantic indexing (LSI). Consider a matrix D of m rows and n columns of Expression (5.1), in which each column corresponding to an active time segment d includes, as its elements, words that appear in the meta data of the video content, as shown in FIG. 5.

This matrix D, subjected to singular value decomposition, is expressed as shown in Expression (5.2). In Expression (5.2), the matrix U is a unitary matrix of m rows and m columns. The matrix $\Sigma$ is a real diagonal matrix of m rows and n columns. Note that the diagonal component of the matrix $\Sigma$ is non-negative. The matrix $V^T$ is an adjugate matrix (complex conjugate and transposed matrix) of the unitary matrix V of n rows and n columns. Using only the first k (k<r) left singular vectors $U_K^T$ of the matrix U, the active time segment d is expressed as the vector $d^{(k)}$ as shown in Expression (5.3). Note however that r is the rank of the matrix D. Thus, the playlist generating section 207 generates a latent profile vector $d^{(k)}$.

Note that the playlist generating section 207 performs the process of calculating Expression (5.3) also for video contents that can be viewed at the current time. Thus, the playlist generating section 207 generates a latent video content vector.

(C) Independent Component Analysis

FIG. 6 is a diagram showing an independent component analysis according to the present embodiment.

Independent component analysis (ICA) has been drawing public attention in recent years as a method for extracting higher-quality latent topics. ICA is a well-known method for sound source separation in voice recognition. In the field of natural language processing or information search, ICA can be used to extract latent topics. As with singular value decomposition, consider a matrix D of m rows and n columns of Expression (6.1), in which each column corresponding to an active time segment $t_d$ includes, as its elements, words that appear in the meta data of the video content. With ICA, also consider a topic matrix S (referred to also as a signal source matrix) as shown in Expression (6.7) of m rows and n columns, in which each column corresponding to a topic $t_s$ includes, as its elements, words that appear in the meta data of the video content. The topic $t_s$ of Expression (6.7) is what is extracted by independent component analysis from words that appear in the meta data, and it may be, for example, "travel", "food", "baseball", etc.

The column vector $t_{dj}$ in the matrix D is a weight vector of an index word (word) in each active time segment $t_d$. The column vector $t_{sj}$ in the topic matrix S is similarly defined as a weight vector of an index word (word) in each topic $t_s$. The weight of the word of the column vector $t_{dj}$ is regarded as being a mixture of the weights $t_{sj}$ of the words included in each topic $t_s$, and is expressed as shown in Expression (6.2). The matrix A in Expression (6.2) is an unknown n×m mixed matrix. In terms of a matrix, Expression (6.2) can be described as Expression (6.3).

ICA is a method for estimating the topic matrix S by only using the active time segment-word matrix D in a case where the topic matrix S and the mixed matrix A are unknown. In practice, it is expressed as shown in Expression (6.4), and the restored matrix W and the restored signal Y are obtained. A method for estimating these is FastICA. Once the restored signal Y is obtained, the latent profile matrix D hat is obtained as shown in Expression (6.5). For individual active time segments, the playlist generating section 207 generates a latent profile vector $t_d$ hat, which is the column vector of the matrix D hat, as shown in Expression (6.6).

Note that the playlist generating section 207 performs the process of calculating Expression (6.6) also for video contents that can be viewed at the current time. Thus, the playlist generating section 207 generates a latent video content vector.

(Recommending Video Contents Using Latent Topics)

The playlist generating section 207 recommends video contents using latent topics as it does when latent topics are not used. Note however that the playlist generating section 207 uses a latent video content vector instead of a video content vector, and uses a latent profile vector instead of a profile vector.

(Specific Example of Calculation)

FIG. 9 is a diagram illustrating a vector representation of a vector space model according to the present embodiment. FIG. 10 is a diagram showing an example of documents and index words according to the present embodiment. FIG. 11 is a diagram showing an example of a search query and a document according to the present embodiment. FIG. 12 is a diagram illustrating the tf-idf value according to the present embodiment. A specific example of calculation in the vector space model will be described with reference to FIGS. 9 to 12.

The vector space model is one algorithm for performing an information search. In the vector space model, documents and search queries are expressed as a vector, as shown in Expression (9.1) of FIG. 9. Normally, since a plurality of documents are handled, the documents are expressed by the matrix D, as shown in Expression (9.2).

As shown in FIG. 10, there are five documents $D_1$ to $D_5$. The documents $D_1$ to $D_5$ are content information (meta data) of a video content. The meta data analyzing section 205 performs morphological analysis on the documents $D_1$ to $D_5$ to extract index words $w_1$ to $w_{10}$. Index words are words that are important in characterizing the content of the document.

Consider a case where one searches the documents $D_1$ to $D_5$ for "alpha mobile". The word "alpha" is an index word $w_1$, and the word "mobile" is an index word $w_5$. Therefore, the search query vector q is expressed by Expression (11.1) of FIG. 11.

On the other hand, the document $D_1$ includes index words $w_1$ to $w_3$, and does not include other index words. Therefore, the vector representing the document $D_1$ is [1,1,1,0,0,0,0,0,0,0]. The document $D_2$ includes index words $w_1$ to $w_4$, and does not include other index words. Therefore, the vector representing the document $D_2$ is [1,1,1,1,0,0,0,0,0,0]. Similarly, the vector representing the document $D_3$ is [1,1,0,0,1,0,0,0,0,0]. The vector representing the document $D_4$ is [1,1,0,1,0,1,1,1,0,0]. The vector representing the document $D_5$ is [2,1,0,0,1,0,0,0,1,1]. As a result, the matrix D representing the documents as a whole is represented by Expression (11.2) of FIG. 11.

If one searches the matrix D representing the documents as a whole using the search query vector q, there is obtained a result that the document $D_3$ on the third row has the highest similarity.

Note that for elements of the video content vector, the tf-idf value is used as described above, instead of the index word $w_i$ as it is. The tf-idf value is an index representing the importance of the index word $w_i$ in representing the content of the document. As shown in Expression (12.1) of FIG. 12, the tf-idf value is calculated as the product of the term frequency (tf) and the inverse document frequency (idf).

The term frequency $tf_{ij}$ is the appearance frequency of the index word $w_i$ in the document Dj. The inverse document frequency $idf_{ij}$ is expressed as shown in Expression (12.2) of FIG. 12. In Expression (12.2), the sign n represents the total number of documents, and the sign $n_i$ represents the number of documents that include the index word $w_i$ therein.

(Flow of Process)

Figure 13:
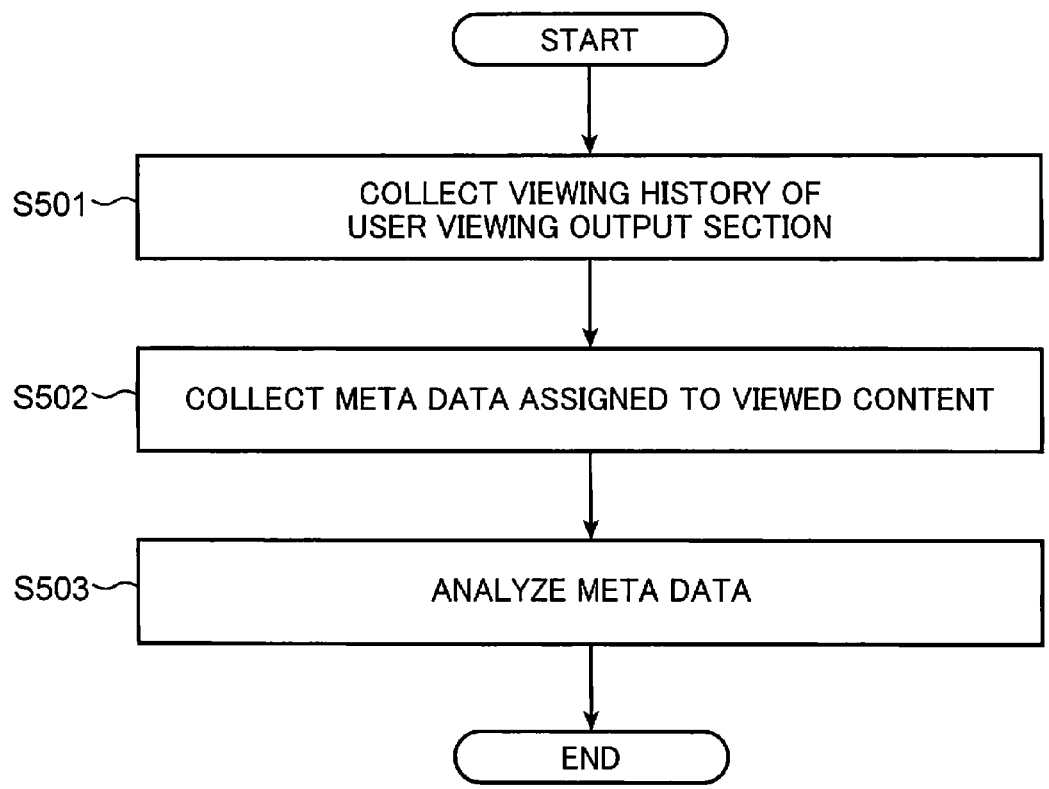
FIG. 13 is a flow chart showing the flow of a process of a content presentation device according to the present embodiment.
Figure 14:
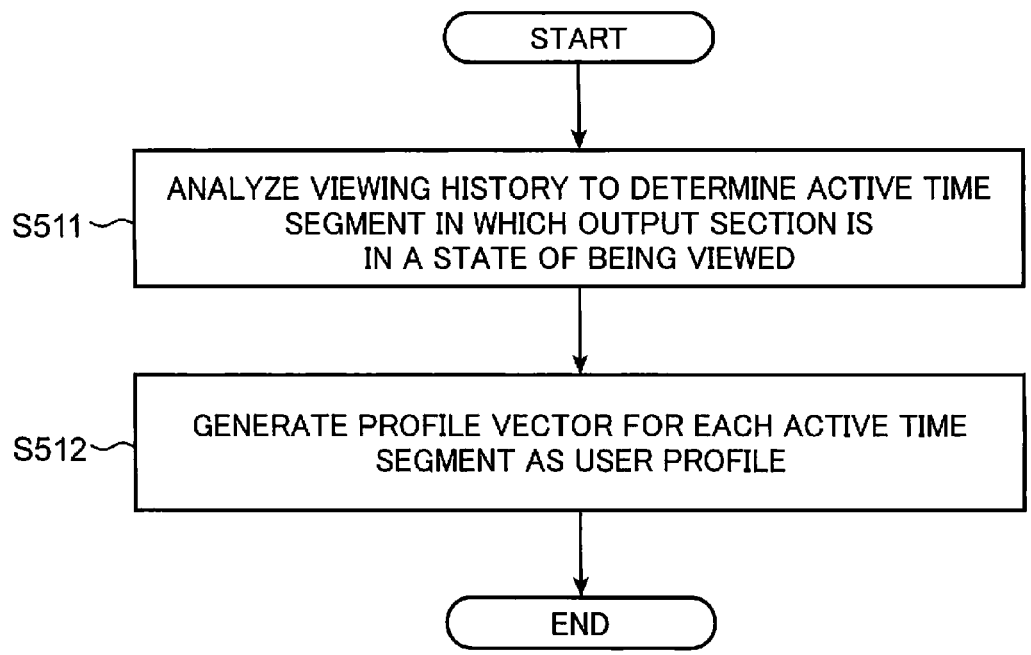
FIG. 14 is a flow chart showing the flow of a process of a content presentation device according to the present embodiment.
Figure 15:
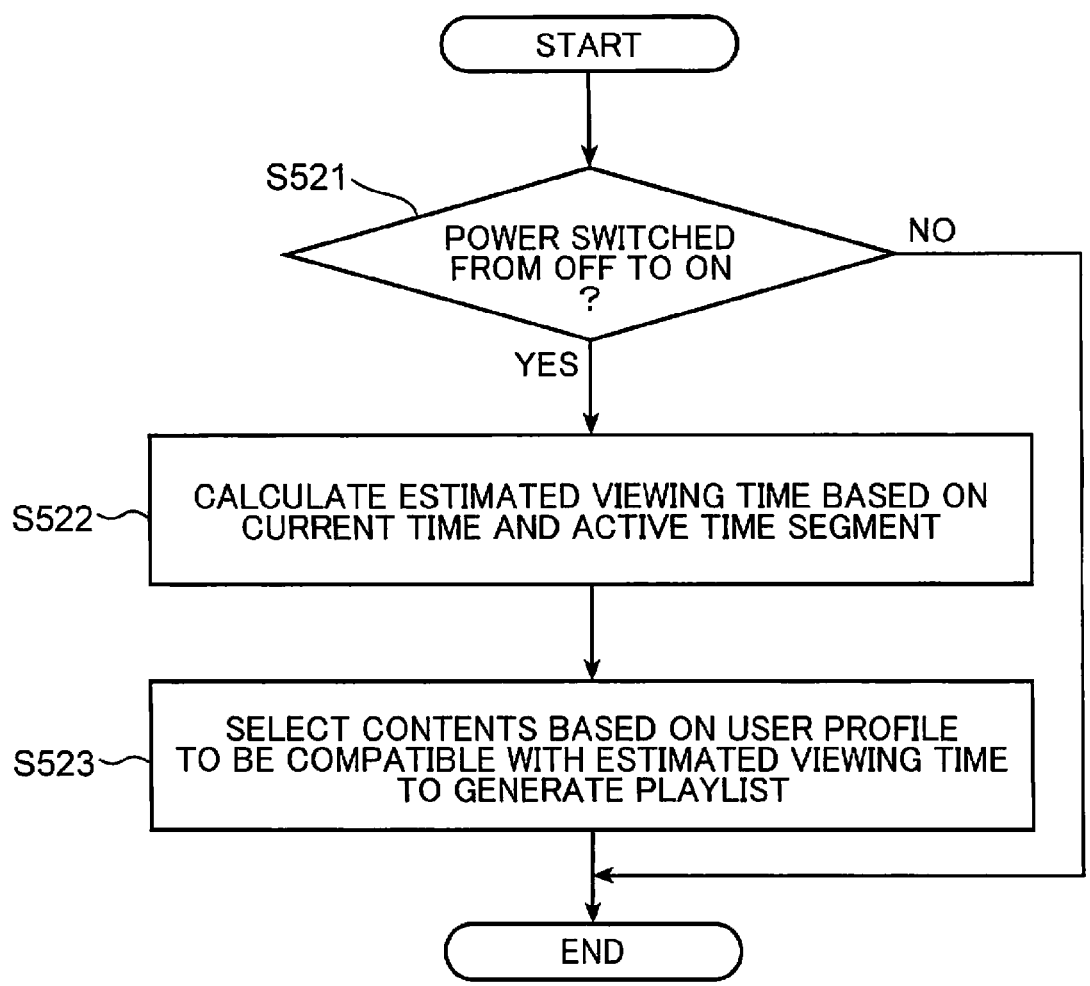
FIG. 15 is a flow chart showing the flow of a process of a content presentation device according to the present embodiment.

FIGS. 13 to 15 are flow charts each showing the flow of the process of the content presentation device according to the present embodiment.

In step S501 (an example of the history collecting step) of FIG. 13, the viewing history collecting section 201 collects and stores the viewing history of the user viewing the contents output on the output section 208. In the following step S502 (an example of the data collecting step), the content information collecting section 204 collects and stores content information (meta data) of all contents that have been displayed on the output section 208 and viewed by the user. In the following step S503 (an example of the analyzing step), the meta data analyzing section 205 analyzes the collected meta data, extracts a predetermined word, and obtains the number of appearances of the extracted word.

The process of FIG. 13 is performed by the viewing history collecting section 201, the content information collecting section 204 and the meta data analyzing section 205 each time the power of the output section 208 is turned ON and OFF.

In step S511 (an example of the determining step) of FIG. 14, the active time segment determining section 202 analyzes the collected viewing history to determine the active time segment in which the output section 208 is in a state where the output section 208 is viewed. In the following step S512 (the profile generating step), the user profile generating section 206 generates a profile vector, as a user profile, for each active time segment.

Following the process of FIG. 13, the process of FIG. 14 may be performed by the active time segment determining section 202 and the user profile generating section 206. Alternatively, the active time segment determining section 202 and the user profile generating section 206 may perform the process of FIG. 14 while the power of the output section 208 is OFF.

In step S521 of FIG. 15, the estimated viewing time calculating section 203 judges whether or not the power of the output section 208 has been turned from OFF to ON. The flow ends if the power of the output section 208 has not been turned from OFF to ON (NO in step S521). On the other hand, if the power of the output section 208 has been turned from OFF to ON (YES in step S521), the estimated viewing time calculating section 203, in step S522 (an example of the calculation step), obtains the current time and calculates the estimated viewing time based on the current time and the active time segment including the current time therein.

Then, in step S523 (an example of the playlist generating step), the playlist generating section 207 selects contents to be recommended to generate a playlist based on the user profile of the current active time segment so as to be compatible with the estimated viewing time.

(Applied Example of Clustering)

The content presentation device of the present embodiment is capable of generating a playlist and recommending appropriate contents even if there is no input of information regarding users (in many cases, information regarding family members) of the output section 208 (a television in the present embodiment). However, users may not mind, if just once, inputting information regarding members of the family before starting to use a television after purchasing the television. For example, it is possible, with a remote controller of a television, to input information of such granularity as the number of people of the family and the roles of them (father, mother, child, etc.).

Thus, if the number of people of the family is known, the user profile generating section 206 may cluster the obtained user profile of each active time segment. The user profile of each active time segment is represented by a latent profile vector of which elements are latent topics. The user profile generating section 206 may cluster the latent profile vector.

In this case, the number k of family members is known in advance. Thus, using k as the number of clusters to be made, the user profile generating section 206 clusters the latent profile vector by using the k-means clustering or the agglomerative method. Thus, the latent profile vector is divided into k clusters.

The user profile generating section 206 combines together user profiles of all active time segments belonging to each of the k clusters generated, thus generating k new user profiles (referred to as "user profiles of clusters"). The user profiles of the k clusters will correspond respectively to the k people of the family.

In this process, the user profile generating section 206 may combine user profiles together by using average values, for example. That is, the user profile generating section 206 may generate a new latent profile vector of which elements are average values among each element of all latent profile vectors belonging to the cluster, and use it as the user profile of the cluster.

When recommending a video content (when generating a playlist), the playlist generating section 207 first obtains the active time segment for the point in time at which recommendation should be made (when the power of the output section 208 is ON) and the user profile. Then, the playlist generating section 207 identifies the cluster to which the latent profile vector of the user profile belongs.

The playlist generating section 207 uses, as the user profile to be used for recommendation, the user profile of the cluster (the combined user profile). Thus, through clustering, an active time segment is extended to a group (cluster) of active time segments including active time segments having similar viewing tendency to the active time segment. Then, the playlist generating section 207 uses the user profile of the cluster.

Moreover, the playlist generating section 207 performs clustering for latent video content vectors of video contents that can be viewed when the power of the output section 208 is ON so as to group the latent video content vectors into k clusters. Based on values of elements of latent video content vectors included in each cluster, the playlist generating section 207 calculates the center-of-gravity vector, which is to be the center of gravity of the cluster.

Then, the playlist generating section 207 calculates the cosine distance between the center-of-gravity vector of each cluster and the user profile of the cluster (the combined user profile described above). The playlist generating section 207 selects contents to be recommended from the cluster for which the calculated cosine distance is largest. The order of content selection within a cluster is the order they are closer to the center of gravity of the cluster. Thus, by performing clustering using the number k of family members, it is possible to increase the possibility of recommending a video content in which the user is interested, of all video contents that are viewable at the current time.

The present embodiment will be further described below with variations thereof.

(1. Various Embodiments Regarding Pseudo Personal Identification)

<1-1. Addressing Input Noise>

It is believed that turning the power of the television ON/OFF and switching between channels thereof may contain noise inputs. For example, regarding turning the power ON/OFF, one may turn the power ON and turn the power OFF right away, remembering something else to do. Regarding switching between channels, for example, one may do what is called "zapping", i.e., successively switching channels from one to another to check if there is another program of interest during commercial messages (CM).

Therefore, in order to ignore short-period viewing in which the user is hardly viewing anything, the viewing history collecting section 201 may delete any viewing history within a certain threshold value (e.g., 10 min). Note however that if the broadcasting time of one program is included within a viewed time segment, the viewing history collecting section 201 may not delete the viewing history. This is for keeping, as the viewing history, viewing of a program of a length of about 5 to 10 minutes.

After the power of the television is turned ON, one may do such a zapping of watching a program on the first channel for a while, switching to the second channel, and then returning to the original first channel. In such a case, if the viewing time on the second channel is within a certain threshold value (e.g., 10 min), the viewing history collecting section 201 may neglect the switching to the second channel in order to ignore zapping. Note again however that if the broadcasting time of one program on the second channel is included within the period in which the channel is switched to the second channel, the viewing history collecting section 201 may not delete the history of switching to the second channel.

<1-2. Addressing Information Noise of Video Content Information>

FIG. 7 is a diagram showing an example of video content information according to the present embodiment.

Program information in EPG data and description text of video contents include some substance therein that is not directly related to the description of the substance of the program or the video. In FIG. 7, lines that start with * are not description representing the substance of the program. Thus, in order to delete these descriptions, the meta data analyzing section 205 may delete, from video content information (meta data), information that fall under conditions (P) to (S) specified below, as being unnecessary text.

(P) from line starting with "Broadcast Content for" to line starting with "Last Updated";

(Q) line starting with "Attribute Information" and following line;

(R) URLs starting with "http://"; and (S) line that includes all of three words: "substance", "change" and "if".

(2. Various Embodiments Regarding Recommending Video Contents)

<2-1. Generating Stop Video List>

When the playlist generating section 207 recommends a video content, the user may view another video content, ignoring the recommendation. In such a case, it is possible that although video content is in conformity with the user profile, but the user hesitated to view the video content for some reason. It is possible that although the user is interested in that topic, but the user is not interested in the particular content. For example, when a fishing program is recommended to a user who likes fishing, if the user does not fish with lures, the user may possibly not view programs dealing with lure fishing. In a case where a user likes political discussion programs but does not like a particular host, the user may possibly not view programs hosted by the particular host.

Even though a content is recommended based on a playlist, in a case where the recommendation of the content is ignored, as described above, the playlist generating section 207 may register the title of the video content on a list. This list is called the "stop video list". For example, the playlist generating section 207 may count the number of times the recommendation of a content is ignored so as to register the content on the stop video list when the number of times the recommendation is ignored reaches a predetermined number of times. Then, even in a case where there is a high similarity between the video content vector (latent video content vector) of a content and the user profile, the playlist generating section 207 does not list the content on the playlist if the content is registered on the stop video list.

<2-2. Recommending in Time Slots Other than Active Time Segment>

It may be possible that the point in time when the user has turned ON the power of the output section 208 (television) happens to be outside the predetermined active time segments. In such a case, the playlist generating section 207 may replace it with the closest active time segment and make recommendation using the user profile of the replaced active time segment. Alternatively, independent of active time segments, the playlist generating section 207 may make recommendation using a user profile generated based on all entire viewing histories of the output section 208 (television).

<2-3. Reading Active Time Segments Ahead>

Assume that the point in time at which the user has turned ON the power of the output section 208 (television) is in the last half of an active time segment. Also assume that once the active time segment ends, the next active time segment begins within a period of a threshold value (e.g., 10 min). In such a case, the playlist generating section 207 may recommend video contents based on the user profile of the next active time segment, as well as recommending video contents based on the user profile of the active time segment to which the current time belongs.

<2-4. Adapting to Length of Active Time Segment>

Assume that the active time segment including therein the current time at which the power of the output section 208 has been turned ON is 30 minutes, and there is a program whose broadcasting time is two hours and which is being broadcast at the current time. Then, even if the two-hour program is recommended, the program cannot be viewed entirely. Assume that the active time segment including therein the current time at which the power of the output section 208 has been turned ON is two hours, and there is a program whose broadcasting time is 30 minutes and which is being broadcast at the current time. Then, even if the 30-minute program is recommended, there will remain one and a half hours. In view of this, the playlist generating section 207 may weigh video contents to be recommended depending on the length of the active time segment.

The cosine distance (cosine similarity) between the video content vector of a content of interest and the profile vector (user profile) is defined as Score, the length of the active time segment as AL, and the length of the broadcasting time of the content of interest as CL. Then, the playlist generating section 207 adjusts the cosine distance Score to the cosine distance AScore as shown in the following expressions.

Where $AL > CL$, $AScore = Score \times (Base + CL/AL)$

Where $AL < CL$, $AScore = Score \times (Base + AL/CL)$

Here, Base is a coefficient for ensuring minimum adjustment of the cosine distance even if the adjustment term (CL/AL or AL/CL) is of a very small value.

Advantageous Effects of the Present Embodiment

In the present embodiment, time segments in which the output section 208 (television) is probably ON are determined as active time segments, and a user profile is generated for each active time segment. To a user having such a life pattern that the user views the output section 208 (television) during the active time segment, video contents that match the viewing history for the active time segment are recommended as a playlist based on the user profile. Determining an active time segment can be said to be pseudo identification of an individual user who has such a life pattern that the user views the output section 208 during the active time segment. As a result, according to the present embodiment, it is possible to recommend video contents appropriate for the individual user.

Thus, the present embodiment can be said to be for performing a pseudo personal authentication and recommending video contents, including television broadcast programs and Internet videos, without providing special hardware, and without imposing a new burden for the personal authentication on the user.

In the present embodiment, the user profile generating section 206 may estimate latent topics of video contents from the content information. Then, it is possible to precisely perform matching between video contents and user profiles. This also solves the problem of failing to recommend a content, which should be recommended in principle because the genre is the same, as the genre is determined to be different because there is no common words. As a result, it is possible to increase the possibility of making recommendations from among all video contents that can be viewed at the current time.

The present embodiment uses countermeasures against users' random actions such as zapping, the act of viewing the output section 208 (television) at a time period different from normal, and noise in the content information, thereby realizing the above-described two advantageous effects without being influenced by these factors.

(Superiority Over Alternative Methods)

In the present embodiment, time segments in which the power of the output section 208 (television) is probably ON are obtained as active time segments, and a user profile is generated for each active time segment. As an alternative method, one may divide 24 hours into time segments of a fixed amount of time (e.g., 30 min) and generate a user profile for each time segment. If the contents are television broadcast programs, the start time and the finish time of each content are set to relatively round-figure points in time such as 7:00 or 7:30. Therefore, it is possible that this alternative method works effectively.

However, where contents are those other than television broadcast programs, e.g., general video contents that can be viewed on demand, the point in time at which to start or finish viewing the content do not need to be convenient for the content providers. Therefore, it is believed that the present embodiment where a user profile is generated for each of the active time segments that accurately model life patterns of viewing users is better than the alternative method described above.

With the content presentation device of the present embodiment, the playlist generating section 207 generates a playlist including contents that suit the estimated viewing time and the user's preferences, and presents the generated playlist to the user. The playlist generating section 207 may further control the output section 208 according to the generated playlist to output contents on the output section 208 in the order defined in the playlist. In such a case, the user does not need to perform the operation of searching for and selecting contents to view. Thus, it is expected that passive viewing is realized also with video contents such as Internet videos to be viewed on demand, as with television broadcast programs.

Content presentation devices according to one or more aspects of the present invention have been described above based on the embodiments and variations thereof. However, the present invention is not limited to these embodiments and variations thereof. Aspects obtained by applying various modifications that occur to those skilled in the art to the present embodiment or variations thereof, and those constructed by combining together elements of different embodiments and variations thereof, are included within the scope of the present invention, without departing from the spirit of the present invention.

Furthermore, the present invention can also be modified as follows.

(1) The content presentation device is specifically a computer system implemented by a microprocessor, a ROM, a RAM, a hard disk unit, a display unit, a keyboard, a mouse, etc. Computer programs are stored in the ROM, or the RAM, or the hard disk unit. The content presentation device achieves its function as the microprocessor operates according to the computer programs. Now, a computer program is a combination of a plurality of instruction codes each indicating an instruction for a computer so as to achieve a predetermined function. Note that the content presentation device is not limited to a computer system including all of a microprocessor, a ROM, a RAM, a hard disk unit, a display unit, a keyboard, a mouse, etc., but may be a computer system composed of some of these.

(2) Some or all of the components of the content presentation device may be implemented by a single system LSI. A system LSI is a super multi-function LSI manufactured with a plurality of component units integrated together on a single chip, and is specifically a computer system including a microprocessor, a ROM, a RAM, etc. Computer programs are stored in the ROM or the RAM. The system LSI achieves its function as the microprocessor operates according to the computer programs.

Note that although it is described as a system LSI, it may be referred to as an IC, an LSI, a super LSI or an ultra LSI, depending on the degree of integration. The method of circuit integration is not limited to LSI, but it may be implemented by a dedicated circuit or a general-purpose processor. One may employ a field programmable gate array (FPGA) which can be programmed after the LSI production, or a reconfigurable processor in which the connection or the setting of circuit cells inside the LSI can be reconfigured after the LSI production.

Moreover, if a circuit integration technique that replaces LSI emerges because of the advancement of semiconductor technology or alternative technology deriving therefrom, functional blocks may of course be integrated by using such technology. It may be an application of biotechnology, etc.

(3) Some or all of the components of the content presentation device devices described above may be implemented by an IC card or a single-unit module that can be inserted into or removed from the devices. The IC card or the module is a computer system implemented by a microprocessor, a ROM, a RAM, etc. The IC card or the module may include the super multi-function LSI described above. The IC card or the module achieves its function as the microprocessor operates in accordance with computer programs. The IC card or the module may be tamper-resistant.

(4) The present invention may be a method of which steps are operations of characteristic components of the content presentation device described above. The present invention may also be a computer program that implements these methods by using a computer, or a digital signal of the computer program.

The present invention may also be a computer program or a digital signal stored in a computer-readable recording medium, e.g., a flexible disk, a hard disk, a CD-ROM, an MO, a DVD, a DVD-ROM, a DVD-RAM, a BD (Blu-ray (registered trademark) Disc), a semiconductor memory, etc. The present invention may be the computer program of the digital signal stored in these recording media.

The present invention may be the computer program or the digital signal being transferred via a network such as a telecommunication network, a wireless communication network, a wired communication network and the Internet, or data broadcasting, etc.

The present invention may be a computer system including a microprocessor and a memory, wherein the memory may store the computer program, and the microprocessor may operate in accordance with the computer program.

The program or the digital signal may be carried out by another independent computer system by recording it on the recording medium and transferring it thereto, or by transferring the program or the digital signal via the network, etc.

(5) The embodiments and the variations described above may be combined together.

The embodiments disclosed herein should be considered as being illustrative and non-limiting in every respect. The scope of the present invention is shown by the claims but not by the above description, and it is intended that any changes are included therein as long as they have equivalent meaning to the claims and as long as they are within the scope of the claims.

INDUSTRIAL APPLICABILITY

A content presentation device according to one aspect of the present invention is useful as a device for presenting contents suitable for user's preferences and circumstances.

The invention claimed is:

1. A content presentation method in a content presentation device which presents a content to a user, the method comprising:

a history collecting step of collecting a viewing history of the user viewing a content output on an output section;

a determining step of analyzing the collected viewing history to determine an active time segment in which the output section is in a state of being viewed;

a data collecting step of collecting meta data assigned to the content viewed by the user;

an analyzing step of analyzing the collected meta data to extract first words representing the viewed content;

a profile generating step of generating, for each of the determined active time segments, a user profile based on the extracted first words corresponding to the content viewed in the active time segment of interest;

a calculation step of obtaining current time and identifying an active time segment including the obtained current time, to calculate an estimated viewing time, which is a time length from the obtained current time to a point in time at which the identified active time segment ends; and a playlist generating step of selecting contents based on the user profile generated correspondingly to the identified active time segment to be compatible with the calculated estimated viewing time, to generate a playlist which defines an order in which the selected contents are played, wherein the profile generating step includes:
 a step of generating a matrix having columns corresponding to the determined active time segments, respectively, and rows of tf-idf values of the extracted first words, a tf-idf value being a product of a term frequency of the extracted first words and an inverse document frequency of the extracted first words; and
 a step of generating, as the user profile for each active time segment, a latent profile vector from the generated matrix using a singular value decomposition or an independent component analysis, the latent profile vector indicating a topic being latently represented by the extracted first words; and wherein the playlist generating step includes:
 a step of identifying selection candidate contents that can be viewed at the obtained current time;
 a step of extracting second words representing the identified selection candidate contents from meta data assigned to the identified selection candidate contents;
 a step of generating a vector, of which an element is the tf-idf value of the extracted second words;
 a step of generating a latent video content vector from the generated vector using a singular value decomposition or an independent component analysis, the latent video content vector indicating a topic being latently represented by the extracted second words; and
 a step of comparing each of the latent video content vectors of the selection candidate contents and the latent profile vector to select contents to be listed on the playlist from the selection candidate contents based on similarity between the compared vectors.

2. The content presentation method according to claim 1, further comprising an outputting step of outputting, on the output section, the selected contents in the order defined in the generated playlist.

3. The content presentation method according to claim 1, wherein the history collecting step does not collect a content viewed by the user as the viewing history when a broadcasting time of the content viewed by the user exceeds a time segment in which the output section is in a state of being viewed and is not more than a predetermined threshold value.

4. The content presentation method according to claim 1, wherein
 the output section is a television receiver; and
 if the user switches a channel to another and the user then switches the channel from the other channel back to the original channel within a predetermined threshold amount of time, the history collecting step does not collect the switching of the channel by the user as the viewing history except when broadcast of the content finishes while the other channel remains on.

5. The content presentation method according to claim 1, wherein
 the playlist generating step includes a step of counting a number of times the selected content has been included in the playlist and has not been viewed by the user; and
 the playlist generating step does not include, in the playlist, a content for which the counted number of times reaches a predetermined number of times even when the content is selected based on the user profile.

6. A content presentation device comprising:
a display device; and
a microprocessor or an LSI which is connected to the display device and configured to perform functions of:
a history collecting section which collects a viewing history of a user viewing a content displayed on the display device;
a determining section which analyzes the collected viewing history to determine an active time segment in which the display device is in a state of being viewed;
a data collecting section which collects meta data assigned to the content viewed by the user;
an analyzing section which analyzes the collected meta data to extract first words representing the viewed content;
a profile generating section which generates, for each of the determined active time segments, a user profile based on the extracted first words corresponding to the content viewed in the active time segment of interest;
a calculating section which obtains current time and identifies an active time segment including the obtained current time, to calculate an estimated viewing time which is a time length from the obtained current time to a point in time at which the identified active time segment ends; and
a playlist generating section which selects contents based on the user profile generated correspondingly to the identified active time segment to be compatible with the calculated estimated viewing time, to generate a playlist which defines an order in which the selected contents are played, wherein the profile generating section includes:
 a section with generates a matrix having columns corresponding to the determined active time segments, respectively, rows of tf-idf values of the extracted first words, a tf-idf value being a product of a term frequency of the extracted first words and an inverse document frequency of the extracted first words; and
 a section which generates, as the user profile for each active time segment, a latent profile vector from the generated matrix using a singular value decomposition or an independent component analysis, the latent profile vector indicating a topic being latently represented by the extracted first words; and wherein the playlist generating section includes:
 a section which identifies selection candidate contents that can be viewed at the obtained current time;

a section which extracts second words representing the identified selection candidate contents from meta data assigned to the identified selection candidate contents;

a section which generates a vector, of which an element is the tf-idf value of the extracted second words;

a section which generates a latent video content vector from the generated vector using a singular value decomposition or an independent component analysis, the latent video content vector indicating a topic being latently represented by the extracted second words; and a section which compares each of the latent video content vectors of the selection candidate contents and the latent profile vector to select contents to be listed on the playlist from the selection candidate contents based on similarity between the compared vectors.

7. A non-transitory computer-readable recording medium which stores a program for controlling a content presentation device which presents a content to a user, the program causing a computer of the content presentation device to execute:

a history collecting step of collecting a viewing history of the user viewing a content output on an output section;

a determining step of analyzing the collected viewing history to determine an active time segment in which the output section is in a state of being viewed;

a data collecting step of collecting meta data assigned to the content viewed by the user;

an analyzing step of analyzing the collected meta data to extract first words representing the viewed content;

a profile generating step of generating, for each of the determined active time segments, a user profile based on the extracted first words corresponding to the content viewed in the active time segment of interest;

a calculation step of obtaining current time and identifying an active time segment including the obtained current time, to calculate an estimated viewing time which is a time length from the obtained current time to a point in time at which the identified active time segment ends; and a playlist generating step of selecting contents based on the user profile generated correspondingly to the identified active time segment to be compatible with the calculated estimated viewing time, to generate a playlist which defines an order in which the selected contents are played, wherein the profile generating step includes:

a step of generating a matrix having columns corresponding to the determined active time segments, respectively, and rows of tf-idf values of the extracted first words, a tf-idf value being a product of a term frequency of the extracted first words and an inverse document frequency of the extracted first words; and a step of generating, as the user profile for each active time segment, a latent profile vector from the generated matrix using a singular value decomposition or an independent component analysis, the latent profile vector indicating a topic being latently represented by the extracted first words; and wherein the playlist generating step includes:

a step of identifying selection candidate contents that can be viewed at the obtained current time;

a step of extracting second words representing the identified selection candidate contents from meta data assigned to the identified selection candidate contents;

a step of generating a vector, of which an element is the tf-idf value of the extracted second words;

a step of generating a latent video content vector from the generated vector using a singular value decomposition or an independent component analysis, the latent video content vector indicating a topic being latently represented by the extracted second words; and a step of comparing each of the latent video content vectors of the selection candidate contents and the latent profile vector to select contents to be listed on the playlist from the selection candidate contents based on similarity between the compared vectors.

* * * * *